ROBERT J. McGROGAN INVENTOR

United States Patent Office 3,408,940
Patented Nov. 5, 1968

3,408,940
FLOW CONTROL CIRCUIT
Robert J. McGrogan, South Bend, Ind., assignor to Robertshaw Controls Company, Richmond, Va., a corporation of Delaware
Filed July 27, 1966, Ser. No. 568,186
15 Claims. (Cl. 103—25)

ABSTRACT OF THE DISCLOSURE

This disclosure relates to an electronic low flow control circuit. An A.C. bridge circuit is used to control conduction of a silicon controlled rectifier. Two temperature sensitive elements are used in adjacent legs of the bridge and are self-heated by the current flow through the elements. One of the legs has a unidirectional circuit connected in parallel with it causing one temperature sensitive element to be self-heated to a greater extent than the other temperature sensitive element. The temperature sensitive elements are positioned to respond to the flow of material in a system such as a water supply system. So long as the flow is above a desired level the thermal energy tending to heat the temperature sensitive elements is carried away causing the output of the bridge circuit to remain below that needed to cause the silicon controlled rectifier to conduct. When the flow drops to an undesired level the bridge circuit provides an output signal sufficient to cause the silicon controlled rectifier to conduct. The current flow through the silicon controlled rectifier is used to operate a thermal delay switch connected to control the flow of material in a system.

---

Figures 1, 2:
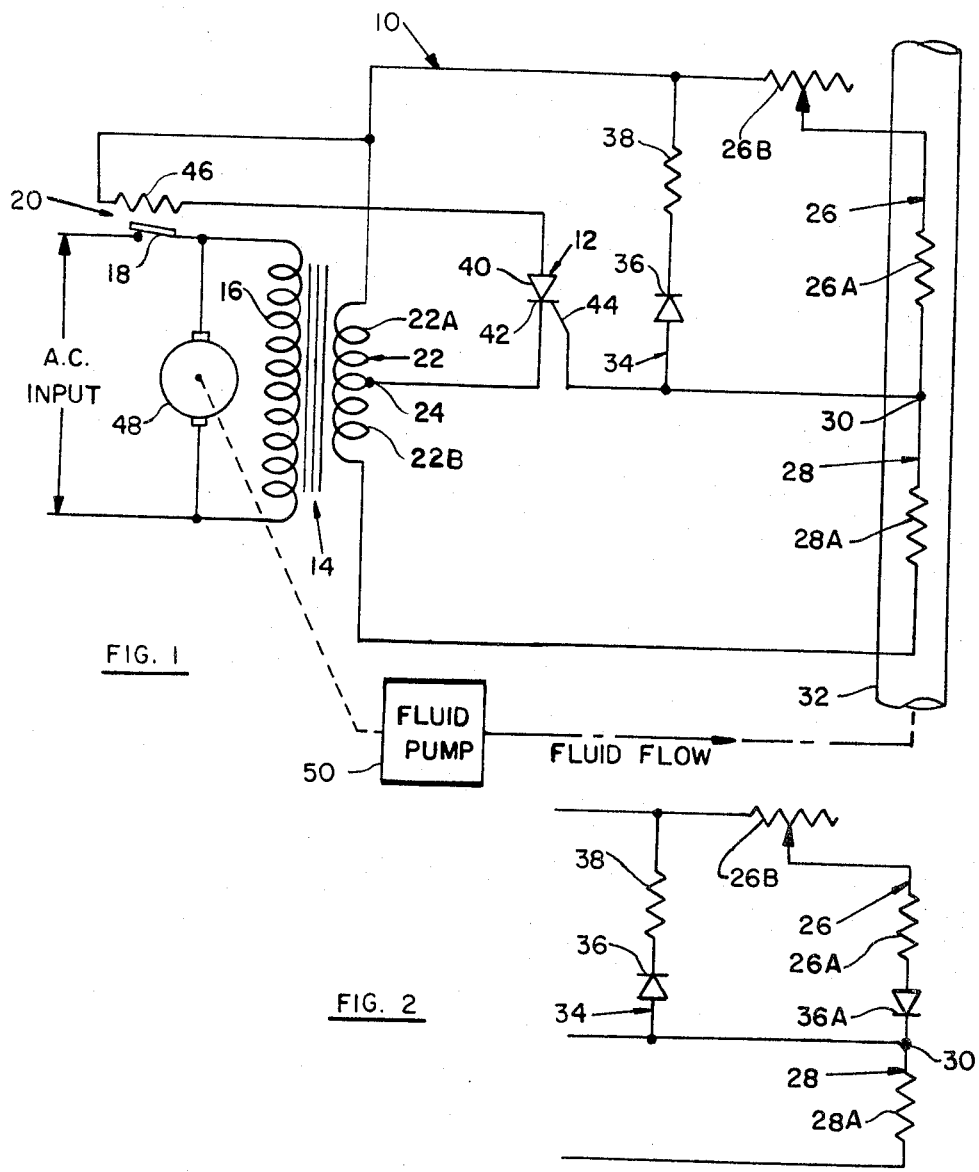

The invention presented herein relates to flow controls utilizing temperature sensitive elements in an electrical bridge circuit the output of which provides a control signal for use in controlling the flow of material in a system. One of the temperature sensitive elements receives a greater thermal input than the other which is effective to change the output of the bridge circuit in accordance with the degree to which the flow of material is effective to carry away such thermal input.

In prior art control circuits of this type the sensing elements are self-heating or are heated indirectly by a separate heater. The flow control circuit disclosed herein is of the type using self-heated sensing elements.

It is an object of the invention to self-heat one of two temperature sensitive elements that are in separate legs of an A.C. bridge circuit to a greater degree than the other by increasing the current flow through said one element and decreasing the current flow through the other during one half of each cycle of the A.C. source.

It is another object of the invention to use a phase sensitive switch means connected to the bridge circuit in a manner such that it can be activated only in response to the output of the bridge circuit presented during the other half of each cycle of the A.C. source.

It is a further object of this invention to use such a bridge circuit and phase sensitive switch means for operating a time delay device which when activated is effective to terminate the flow of material past the temperature sensing elements in the bridge circuit.

Still another object of this invention is to use such a bridge circuit and phase sensitive switch means for operating a time delay device which when activated in respone to the output of the phase sensitive switch means is effective to terminate the energization of the bridge circuit and the flow of material past the temperature sensing elements of the bridge circuit.

An additional object is to have the temperature sensitive elements in such a bridge circuit made from the same material having a substantially linear coefficient of resistance in the temperature operating range and presenting substantially the same resistance at a given temperature so the bridge will be automatically compensated for changes in the ambient temperature of the material being handled by a flow system.

Other objects and advantages of the invention presented herein will become apparent as the description thereof proceeds.

In accordance with the invention the foregoing objects are attained by use of an A.C. energized bridge circuit in which two similar temperature sensitive resistive elements are disposed in the path of flow of material being handled or moved in a material flow system. The temperature sensitive elements are connected in different legs of the bridge. The legs containing the temperature sensitive elements are connected across the A.C. input signal to the bridge with the juncture of these legs providing one output terminal of the bridge. If this were the only structure used, current flow through the temperature sensitive elements would be the same for each half of the A.C. cycle so the self-heating effect for each of the elements would be the same. In a preferred embodiment of the invention differential self-heating of the temperature sensitive elements is obtained by leaving one leg unchanged and connecting a unidirectional circuit branch in parallel with the other leg. This circuit branch is, of course, conductive only during one half of the A.C. cycle. During the other half of the A.C. cycle the current through the two temperature sensitive elements is the same since the unidirectional circuit branch will not be conducting. With this circuit modification the current through the temperature sensitive element in said one leg for said one half of the A.C. cycle is greater than the current flow during said other half cycle while the current flow through the temperature sensitive element in the other leg is less. This is true since the impedance presented to the A.C. input by the series-parallel circuit formed by the two legs and the unidirectional circuit branch is less during said one half of the A.C. cycle. The total current through this combination flows, of course, through said one leg. Since the self-heating is directly proportional to the square of the current, self-heating of the temperature sensitive element in said one leg is therefore greater than the self-heating of the other temperature sensitive element.

The output signal from the bridge controls a phase sensitive switch means which is connected to be activated only during said other half of the A.C. cycle provided the proper bridge output is present. An output capable of activating the phase sensitive switch means occurs when the flow of material does not remove enough of the heat from the temperature sensitive element of said one leg of the bridge causing it to rise in temperature to present a different value of resistance. Activation of the phase sensitive means causes a time delay device to be energized which will terminate the flow of material should the undesirable low flow condition continue for a time sufficient to complete the actuation of the time delay device.

The novel features which are believed to be characteristic of this invention are set forth with particularity in the appended claims. The invention plus further objects and advantages thereof, may be best understood by reference to the following description presented in connection with the accompanying drawing.

In the drawing:
FIG. 1 is a schematic wiring diagram for a low-flow cutout control circuit embodying the invention, and
FIG. 2 is a partial showing of the wiring diagram of FIG. 1 modified to provide a second low-flow cutout control circuit embodying the invention.

Referring to FIG. 1, there is shown a four-leg alternating current bridge circuit 10 connected to control a phase sensitive switch means 12. The bridge circuit includes a transformer 14 having its primary winding 16 connected to an alternating current source via the switch structure 18 of a time delay switch device 20. The secondary winding 22 of transformer 14 has a tapped connection 24 allowing the winding 22 to form a part of the bridge circuit 10. In order to simplify the explanation of the invention the tapped connection will be considered as being at the electrical center of the winding 22. A center tapped winding 22 will, of course, simplify the temperature compensation problem for the remaining legs of the bridge, legs 26 and 28. Thus, the upper half 22a of winding 22 serves as one leg of the bridge circuit 10 and the lower half 22b serves as another leg with the tapped connection 24 common to legs 22a and 22b providing one output point for the bridge circuit.

Two legs of branches 26 and 28 are connected in series and the combination connected across the secondary winding 22 to complete the bridge circuit 10 with the connection 30 common to the legs 26 and 28 providing the other output point for the bridge. The leg 26 includes a temperature responsive resistive portion 26a and a resistive portion 26b. The latter may be variable and used for adjusting or selecting the operating point for the bridge. The leg 28 is also resistive and may be formed from a single temperature resistive element 28a made from the same material as the resistive element 26a. One temperature responsive wire which has been found acceptable for use is made from nickel-iron wire containing approximately 72% nickel which presents a positive coefficient of resistance that is linear over a fairly wide range of temperature. The resistive elements 26a and 28a are electrically insulated, but exposed to the flow of material in a system. It is desirable that resistive elements 26a and 28a be of the same material and substantially the same value in order that changes in the temperature of the material being moved past them will influence them in a like manner to cause the bridge to be automatically compensated for such temperature change.

With the bridge circuit 10 as described it is apparent that the resistance in legs 26 and 28 must differ if the bridge is to present an output signal between point 24 and 30. When an output signal is present due to a difference presented between the impedance of leg 26 and 28, it will vary in magnitude and will be in phase with the voltage across leg 22 or 180° out of phase with the voltage across leg 22. When leg 26 presents less resistance than leg 28, a voltage difference will appear between between connections 24 and 30 which when measured at connection 30 with respect to connection 24 is in phase with the voltage measured between the upper end of secondary winding 22a and connection 24. This is readily understood if the extreme case is considered, i.e., assume the impedance presented by leg 26 is zero. In such case the connection 30 is electrically the same as the upper end of leg 22a. The voltage between the upper end of leg 22a and connection 24 and between connections 30 and 24 are then identical in amplitude and phase. The maximum amplitude of the alternating voltage appearing between the connections 30 and 24 will, of course, decrease as resistance is introduced between the upper end of winding 22 and connection 30. Similarly, when leg 26 presents a resistance which is greater than the presented by leg 28, the voltage at connection 30 as measured with respect to connection 24 is in phase with the voltage measured at the lower end of secondary winding 22 with respect to connection 24 and therefore 180° out of phase with the voltage measured between the upper end of a secondary winding 22 and connection 24. The maximum amplitude of the alternating voltage appearing between connections 30 and 24 when leg 26 presents a greater resistance than leg 28 varies directly with the amount of unbalance present between the resistance in leg 26 and the resistance in leg 28.

It is apparent that the magnitude of the output voltage between connections 30 and 24 cannot be used to indicate when a certain degree and direction of unbalance has been reached since a voltage of a given magnitude can be obtained when the resistance of leg 28 is greater than the resistance of leg 26 and when it is less than the resistance of leg 26. This ambiguity is resolved by using the phase sensitive switch means 12 to respond to the bridge output. Being phase sensitive it requires an input signal from the bridge which is above a certain level and of a certain phase of polarity with relation to a reference voltage.

The bridge circuit as described up to this point can be used as a part of a flow control circuit by placing the temperature sensitive elements 26a and 28a in a position to respond to the flow of material in a system. Thus, the elements 26a and 28a are shown in the drawing as responding to the flow through the conduit 32 of a fluid flow system. In order that the output of the bridge will change with changes in the degree of flow it is necessary that one of the elements 26a or 28a be heated above the ambient temperature of the material being moved by the system. How effective the thermal input to the heated element is carried away by the material determines the magnitude of unbalance of the bridge. As mentioned earlier both of the temperature sensitive elements 26a and 28a are, of course, exposed to the flow to automatically compensate for changes in the ambient temperature of the material being moved.

This invention provides a novel way of self-heating one of the temperature sensitive elements to a greater degree than the other. Thus, a unidirectional circuit branch 34 is connected in parallel with the leg 26 of the bridge. The circuit branch 34 includes a diode 36 and a resistive element 38 connected in series. The diode 36 is poled so the branch 34 conducts during that half or phase of the A.C. cycle when the phase sensitive device 12 cannot conduct. Thus, for the embodiment shown in FIG. 1, the current flow through the branch 34 can only be from the output point 30 to the upper end of leg 22a and only for one half of each cycle when the point 30 is positive with respect to the upper end of leg 22a. It is apparent then that the current flow through legs 26 and 28 during the other phase or half cycle of the A.C. voltage will be equal since the branch 34 will not be conducting and legs 26 and 28 are in series. Self-heating of these legs due to the latter current flow will be substantially the same since the legs present substantially the same resistance. The current during such other phase or half cycle is determined by the resistance of leg 26 plus leg 28. During said one half of each cycle when branch 38 is conductive, the current is determined by the sum of the resistance of leg 28 plus the resistance of the leg 26 in parallel with resistance 38. This sum will be less than the sum of leg 26 and leg 28 so the current flow during said one half is increased causing the self-heating of leg 28 to be greater during said one half cycle than during said other half cycle. This increase in current flow causes a corresponding increase in the voltage drop across leg 28. This, of course, means the current flow through leg 26 will be reduced from that present during said other half cycle causing a reduction in the self-heating in leg 26. The value of resistance 38 is selected to control the amount of change in current flow and therefore the degree of self-heating of leg 28. While it is shown as a fixed resistance, it is apparent that it can be a variable resistance.

It should be noted that resistance 26b in leg 26 is shown as being adjustable. The adjustment point selected for resistance 26b determines the set or operating point for the bridge. Thus, as additional resistance is added by 26b it is necessary for the temperature resistive element 28a to present a higher resistance in order for the bridge to present an operative signal to the phase sensitive switch means 12. This would, of course, mean the flow through system must reach a lower level to have a self-heating cause the resistance of element 28a to increase and cause the bridge to provide an operative signal for the phase sensitive switch means 12.

FIG. 2 shows a portion of the bridge circuit of FIG. 1 which also embodies the invention. The differential self-heating of resistance 26a and 28a is obtained by use of the unidirectional circuit branch 34 connected in parallel with leg 26 of the bridge as is done in the circuit of FIG. 1. In addition diode 36a is added to leg 26 and is poled opposite to diode 36 so that leg 26 does not conduct during that half of the cycle when branch 34 is conducting. The degree of differential self-heating can be more readily calculated with such an arrangement since only the simple series circuit including the resistance 28a and branch 34 is involved. In the circuit of FIGURE 1 the differential self-heating is the function of a series-parallel circuit, i.e., leg 28 in series with the parallel circuit including leg 26 in parallel with branch 34.

The phase sensitive switch means 12 can be any of a number of commercially available phase sensitive electronic devices, such as a thyristor, i.e., a semiconductor device having control characteristics similar to those of thyratron tubes. The "on-off" or switch action provided by a thyristor or circuits equivalent thereto, is especially useful in the embodiment disclosed to energize a heat motor actuated switch which, as will be described, is used to provide a time delay. A single transistor controlled in response to the bridge output would not be satisfactory since its output would be proportional to the degree of bridge unbalance and therefore, would not cause the heat motor actuated switch to provide a consistent time delay such as will be provided by the output of an "on-off" switching device.

A silicon controlled rectifier (SCR) is one phase sensitive electronic switch that has been found to be satisfactory. The device 12 for the disclosed embodiment is a silicon controlled rectifier (SCR) and has three electrodes, an anode, cathode and gate, which are identified by numerals 40, 42 and 44, respectively. A silicon controlled rectifier (SCR) is a semiconductor device which, as the name indicates, conducts current primarily in one direction. However, unlike the conventional rectifier the SCR will not present a low internal resistance to current flow in the forward direction unless the anode voltage exceeds a certain minimum voltage called the forward breakdown voltage.

Referring to the drawing the SCR 12 is connected with the anode 40 electrically connected to the upper end of the secondary winding 22 via the actuating heater element 46 of the time delay switch device 20. Cathode 42 is connected to the tapped connection 24 and the gate 44 is connected to the output point 30 of the bridge 10. The transformer 14 is a step-down transformer to provide a voltage for operating the SCR 12. Thus, it may provide 24 volts A.C. across its secondary winding 22 which is a suitable voltage. Since the connection 24 is considered as being at the electrical center of the winding 22, 12 volts A.C. are supplied between the anode 40 and cathode 42. The 12 volts alone will not cause the SCR 12 to conduct in the forward direction. This voltage applied to the anode 40, however, exceeds the minimum forward breakdown voltage when the gate 44 has a voltage applied to it which is positive with respect to the cathode 42 and is applied at the same time that the forward voltage is present at the anode 40. The nominal gate voltage required is .6 v. at 25° C. and decreases slightly at a substantially uniform linear rate with an increase in temperature of the SCR. When the forward breakdown voltage is thus modified by such a gate signal, the high internal resistance of the device changes to a very low value to permit a high current to flow through the device. Once the SCR is triggered by the gate signal to the "on" mode the current flow is independent of gate voltage or current and the SCR remains in the high conduction "on" mode until the anode current is reduced to a level below that required to sustain conduction. Such, of course, is the case during each negative half of the A.C. voltage. The SCR is thus phase sensitive since the anode and gate must be positive with respect to the cathode to place the SCR in the "on" mode.

In the bridge circuit described, the proper phase relationship needed to place the SCR in the "on" mode occurs when the resistance presented by leg 28 is greater than the resistance presented by leg 26. When the anode to cathode and gate to cathode voltages are in phase the SCR is placed in the "on" mode for at least a portion of each positive half-cycle. During the negative half-cycle only a very small current flows through the SCR. As mentioned previously, it is necessary that the gate voltage be at least .6 v. (at 25° C.) to have the SCR turned "on." Therefore, when the temperature sensitive resistance element 28a decreases to the point where the amplitude of the gate to cathode voltage (bridge output) drops below .6 v. the SCR switches to the "off" mode until the gate to cathode voltage again reaches .6 v. and is in phase with the anode to cathode voltage.

The high current flow provided when the SCR 12 is in the "on" mode causes the actuating heater element 46 of the time delay device 20 to be energized. The switch structure 18 of device 20 includes a bimetallic switch arm which is thermally connected to the heater element 46. The bimetallic switch arm upon being heated moves in a direction to open the circuit via the time delay device 20. Thus, if the heater element 46 remains energized for a sufficient period of time, the time delay device 20 will be operated to open the circuit to the A.C. power supply. With the power to the bridge circuit 10 thus terminated, the temperature resistive elements 26a and 28a will no longer be self-heated and will respond to the ambient temperature. In addition, the bimetallic switch arm of switch structure 18 will no longer be heated. A time delay is thus introduced which is a function of the time required for the bimetallic switch arm to cool and move the switch contacts to the closed position. Once the circuit is closed via the time delay device 20, the bridge 10 is again placed in operation.

The bridge circuit 10 controlling the SCR 12 for operation of a time delay switching device 20 is used for controlling the flow of material in a system. Thus, in the drawing there is shown means for moving material past the sensing elements 26a and 28a via the conduit 32 which is controlled by the time delay switching device 20. In the particular embodiment shown in the drawings such means includes a motor 48 connected to drive a pump 50 which when operating cause the material handled by a system to flow through the conduit 32. The motor 48 is connected to the A.C. source via the switch structure 18 of device 20.

A specific use for the embodiments shown in the drawing is as a low flow control for water supply systems using submersible pumps in which water flow is used for cooling and lubricating the pump. Low well recovery, falling water tables and clogged screens can reduce the water flow below the safe operating level for the pump. The disclosed system is used for monitoring the flow of water from the pump and is effective to stop the pump motor whenever the flow drops below the safe flow level.

When used as a low flow control the system is connected to the A.C. power source via a pressure responsive switch (not shown). Thus, when the water pressure in the storage tank (not shown) drops to a level to cause the pressure switch to close, the pump motor 48 and the sensing circuitry are energized via the pressure switch (not shown) and the switch structure 18 of device 20. The energization of bridge 10 provides sensing resistance 28a with more electrical energy than sensing resistance 26a due to the unidirectional circuit branch 34 connected in parallel with the bridge leg 26 containing sensing resistor 26a. However, with sufficient water flow through conduit 32 the self-heating of resistances 26a and 28a due to the current passing through them is minimized since the water flow will dissipate the heat generated at sensors 26a and 28a due to current flow. The difference in temperature at sensor 28a and sensor 26a needed to provide a signal at the output terminals 24 and 30 is determined by the resistance in leg 26 which is made adjustable by the variable resistance 26a. The difference in temperature between sensor 28a and sensor 26a is, of course, a function of the water flow. Thus, for a given setting of variable resistance 26b the bridge 10 will not provide a signal to cause the phase sensitive switch means 12 to conduct until the flow through conduit 32 drops below a level to allow sensor 28a to increase in temperature, and therefore in resistance, the amount required to unbalance the bridge to provide a signal of the proper phase and magnitude to operate the phase sensitive switch means 12. An increase in the portion of resistance 26b forming a part of leg 26 will require the flow through conduit 32 to drop to a lower level in order to allow the temperature of resistance 28a to increase a sufficient amount to cause the bridge 10 to provide a triggering signal for the phase sensitive switch means 12. A decrease in the setting of resistance 26b, of course, is effective to raise the low flow level permitted.

Once the flow drops below the desired level the bridge 10 provides the necessary output signal to cause the SCR 12 to conduct for a portion of each cycle of A.C. power source to supply current through the heater 46 of time delay switch device 20. If the low flow continues long enough the temperature of the bimetal switch arm in the device 20 rises to the level needed to cause the bimetal to open the switch 18. This, of course, terminates the energization of the bridge circuit 10 and the motor 48 for driving the pump 50. Upon cooling of the bimetal switch arm the switch 18 closes and the bridge 10 and motor 48 are again energized. Another period of sensing for low flow is again started.

It is apparent that an automatic cycling of the control may not be desirable for all application and manual resetting of the time delay switch device 20 would be preferred. Switch devices which can be tripped to an open position using a heat motor input and which require a manual reset operation are well known and could be used in place of the time delay switch device 20 which has been described.

It is also apparent that thermistors or other temperature sensitive impedance elements having a negative coefficient of resistance could be used in place of the temperature sensitive elements 26a and 28a as described which have a positive temperature coefficient. It would be necessary, of course, to then have the unidirectional circuit branch 34 connected in parallel with the leg 28. With such an arrangement a low flow condition would cause the temperature sensitive element 26a to be heated to a greater degree than temperature sensitive element 28a. Since the elements 26a and 28a have a negative temperature coefficient the resistance presented in leg 26 would be reduced by the self-heating to a level below that presented by leg 28 to cause the SCR to be turned "on".

It is to be understood that other forms, modifications and adaptations could be made all falling within the scope of claims which follow.

What is claimed is:

1. A bridge circuit having an A.C. input and output, first and second legs connected at a common point to present a series combination with such series combination connected across said A.C. input, said output being determined by the ratio of resistance presented by said first leg and the resistance presented by said second leg with said common point being at the electrical potential of one side of said output, said first leg having a first sensing means which varies in resistance as a function of temperature, said second leg having a second sensing means which varies in resistance as a function of temperature, said first and second legs presenting substantially the same resistance when at the same temperature, said first and second sensing means drawing sufficient current during one half of each A.C. cycle of said A.C. input to cause self-heating of said first and second sensing means, and a unidirectional conducting circuit connected in parallel with one of said first and second legs and poled to conduct during the other half of each A.C. cycle causing the sensing means of said one leg to be self-heated by current flow during said other half of each A.C. cycle to a lesser extent than the sensing means of said other leg is self-heated by current flow during said other half of each A.C. cycle.

2. The bridge circuit in accordance with claim 1 wherein said unidirectional circuit is a series circuit, one element of which is a diode.

3. The combination in accordance with claim 1 wherein said one of said first and second legs is a unidirectional circuit and includes a diode poled for conduction during said one half of each A.C. cycle.

4. The combination in accordance with claim 1 further including a phase sensitive electronic switch connected to said output for control thereby.

5. The combination in accordance with claim 4 further including a control impedance, said phase sensitive electronic switch connected to said control impedance for controlling the flow of current through said control impedance.

6. The combination in accordance with claim 4 further including a time delay switch means having a control impedance, said control impedance when energized providing the energy input required for operation of said time delay switch, said phase sensitive electronic switch connected to said control impedance for controlling the flow of current through said control impedance.

7. The combination in accordance with claim 4 wherein said phase sensitive electronic switch is a thyristor.

8. The combination in accordance with claim 5 wherein said phase sensitive electronic switch is a silicon controlled rectifier having an anode, cathode and gate, said cathode and gate connected to said output, said anode connected to said input via said control impedance.

9. The combination in accordance with claim 6 wherein said time delay switch means includes switch contacts controlling the A.C. energization of the bridge circuit.

10. Control circuitry for electrically powered means for moving material in a material flow system, such circuitry serving to alter the application of electrical power to such electrically powered means when the flow of material reaches a predetermined level, the combination including: a bridge circuit having an A.C. input and output, first and second legs connected at a common point to present a series combination with such series combination connected across said A.C. input, said output being determined by the ratio of resistance presented by said first leg and the resistance presented by said second leg with said common point being at the electrical potential of one side of said output, said first leg having a first sensing means which varies in resistance as a function of temperature, said second leg having a second sensing means which varies in resistance as a function of temperature, said first and second legs presenting substantially the same resistance when at the same temperature, said first and second sensing means electrically insulated from but positioned in the path of flow of material in the material flow system, said first and second sensing means drawing sufficient current during one half of each A.C. cycle of said A.C. input to cause self-heating of said first and second sensing means, a unidirectional conducting circuit connected in parallel with one of said first and second legs and poled to conduct during the other half of each A.C. cycle causing the sensing means of said one leg to be self-heated by current flow during said other half of each A.C. cycle to a lesser extent than the sensing means of said other leg is self-heated by current flow during said other half of each A.C. cycle, the level of such flow of material determining the effectiveness of the self-heating of the sensing means in said other leg to cause it resistance to change and thereby alter the signal at said output, switch means controlling the application of electrical power to the electrically powered means, said switch means including an electrical actuator, a phase sensitive electronic switch, means connecting said electronic switch to said output of said bridge circuit for control thereby, and means connecting said electrical actuator to said electronic switch causing said electrical actuator to be energized when said electronic switch is placed in an "on" mode of operation by said output of said bridge circuit.

11. The control circuitry in accordance with claim 10 wherein said unidirectional conducting circuit is a series circuit, one element of which is a diode.

12. The combination in accordance with claim 10 wherein said one of said first and second legs is a unidirectional circuit and includes a diode poled for conduction during said one half of each A.C. cycle.

13. The combination in accordance with claim 10 wherein said phase sensitive electronic switch is a thyristor.

14. The combination in accordance with claim 10 wherein said phase sensitive electronic switch is a silicon controlled rectifier having an anode, cathode and gate, said cathode and gate connected to said output and said anode connected to said input via said electrical actuator.

15. The combination in accordance with claim 10 wherein said switch means is a time delay switch means.

References Cited

UNITED STATES PATENTS

| | | | |
|---|---|---|---|
| 1,979,127 | 10/1934 | Warrick | 103—25 |
| 3,084,708 | 4/1963 | Herrero | 137—392 |
| 3,207,963 | 9/1965 | Steghart et al. | 236—78 |
| 3,211,214 | 10/1965 | Chambers | 236—78 |
| 3,223,041 | 12/1965 | Quinn | 103—25 |
| 3,326,040 | 6/1967 | Walsh | 73—204 |
| 3,248,892 | 3/1966 | Sutton et al. | 307—114 |
| 3,315,135 | 4/1967 | Thiele | 137—392 |
| 3,222,578 | 12/1965 | Thiele | 317—148.5 |

WILLIAM L. FREEH, *Primary Examiner.*